(12) United States Patent
Takiwaki (10) Patent No.: US 7,774,926 B2
(45) Date of Patent: Aug. 17, 2010

(54) BEARING ASSEMBLING APPARATUS

(75) Inventor: Yuji Takiwaki, Toyama (JP)

(73) Assignee: Tanaka Seimitsu Kogyo Co., Ltd., Toyama (JP)

( * ) Notice: Subject to any disclaimer, the term of this patent is extended or adjusted under 35 U.S.C. 154(b) by 1261 days.

(21) Appl. No.: 11/325,424

(22) Filed: Jan. 5, 2006

(65) Prior Publication Data

US 2006/0162151 A1    Jul. 27, 2006

(30) Foreign Application Priority Data

Jan. 24, 2005  (JP) .............................. 2005-016192

(51) Int. Cl.
  *B23P 19/04* (2006.01)
  *B23Q 7/10* (2006.01)
(52) U.S. Cl. ............................ 29/724; 29/809; 221/236
(58) Field of Classification Search ................... 29/724, 29/898.06, 898.062, 898.07, 809; 221/236
  See application file for complete search history.

(56) References Cited

U.S. PATENT DOCUMENTS 2,204,655 A * 6/1940 Booty, Jr. ..................... 29/724

FOREIGN PATENT DOCUMENTS

| JP | 34-6002 | 7/1959 |
| JP | 2-107439 | 8/1990 |
| JP | 05-277855 | 10/1993 |
| JP | 10-184717 | 7/1998 |
| JP | 2001-121365 | 5/2001 |
| JP | 2003-28186 | 1/2003 |
| JP | 2004-68838 | 3/2004 |
| JP | 2005-330998 | 12/2005 |
| JP | 2006-2834 | 1/2006 |

* cited by examiner

*Primary Examiner*—David P Bryant
*Assistant Examiner*—Sarang Afzali
(74) *Attorney, Agent, or Firm*—Wenderoth, Lind & Ponack, L.L.P.

(57) ABSTRACT

A bearing assembling apparatus is capable of assembling a bearing at a high speed and preventing an excessive unbalanced load from being applied to an outer ring and an inserting means at a time of inserting a rolling element. The bearing assembling apparatus has a compact size, with an inserting means arranged within an outer ring, and a feeding means guiding a needle to the inserting means. The feeding means is provided with two guide paths which can hold needles in line. The inserting means includes a receiving portion receiving the needles, guide grooves directed toward an installation space in the outer ring, and a cam member having two cam surfaces. The cam surfaces press the needles in the receiving portion toward the installation space. The guide grooves and the cam surfaces are provided at positions such that the last two needles can be simultaneously inserted into the installation space.

16 Claims, 5 Drawing Sheets

BEARING ASSEMBLING APPARATUS

BACKGROUND OF THE INVENTION

1. Technical Field

The present invention relates to a bearing assembling apparatus assembling a predetermined number of rolling elements within an outer ring, and more particularly, to a bearing assembling apparatus capable of assembling a bearing at a high speed, forming an entire apparatus in compact size, and preventing an excessive unbalanced load from being applied to the outer ring and inserting means when inserting the rolling elements.

2. Description of the Related Art

Needle bearings and roller bearings include bearings of a so-called keystone type; a bag-like installation space open to a center side is formed along an inner surface of the outer ring, and a predetermined number of rolling elements are inserted into the installation space. With respect to this type of bearing, it is possible to prevent the rolling elements from getting out of the above installation space to the center side by bringing the rolling elements into contact with each other, thereby making an inner ring unnecessary.

Conventionally, as apparatuses for assembling the bearings of the type mentioned above, apparatuses provided with inserting means arranged within the outer ring, and feeding means for guiding the rolling elements to the inserting means have been known (See Japanese Unexamined Patent Publication No. 2004-68838, for example).

Specifically, in the above conventional art, a lower holder, a cam member, and an upper holder that constitute the inserting means are arranged in an order inside of the outer ring along a center axis thereof, and a receiving portion is formed over the upper and lower holders, thereby one rolling element fed from the feeding means mentioned above can be received. The upper and lower holders are provided with a guide groove directed toward the installation space from the receiving portion. Further, the cam member mentioned above is rotatable around the center axis of the outer ring, and provided with a cam surface pressing the rolling element to the installation space side on an outer peripheral surface of the cam member.

On the other hand, the feeding means is provided with a guide path which can hold the rolling elements in line, and a pressing means for pressing the rolling elements within the guide path so as to feed the rolling elements to the receiving portion. Specifically, the guide path is formed in a shaft portion extending to an upper side of the upper holder mentioned above, and a lower end portion thereof is open so as to face to the receiving portion. Further, the pressing means is formed in a rod shape, and is arranged above the rolling elements in the guide path.

A parts feeder supplies a predetermined number of rolling elements to the guide path by a supply apparatus, and the rolling elements are fed to the receiving portion one by one by the pressing means. The rolling elements received in the receiving portion are pressed with the cam surface by the rotation of the cam member, and are guided along the guide groove and inserted into the installation space. When the receiving portion becomes empty by one rotation of the cam member, one rolling element is fed to the receiving portion through the guide path, and the insertion of the rolling elements by the rotation of the cam member is repeated until no rolling element is left within the guide path and the receiving portion.

In the conventional art mentioned above, one rolling element is inserted into the installation space by one rotation of the cam member, since there is provided one set of the guide path, the receiving portion, and the cam surface. In other words, in order to insert the predetermined number of rolling elements to the installation space mentioned above, it is necessary to rotate the cam member the predetermined number of times. This makes it difficult to reduce a working time for assembling the bearing.

Further, since the guide path mentioned above holds the predetermined number of rolling elements in line, the guide path is required to be long, and it is necessary to form the pressing means for pressing the rolling elements within the guide path in long size. This makes it difficult to make an entire apparatus in compact size.

Moreover, when the last one of the rolling elements is inserted, it is press-fitted into a gap between two rolling elements at both ends of the rolling elements arranged in line along the inner peripheral surface of the outer ring. Because the outer ring and the cam member are exposed to a stress from one direction due to the pressing force at this time of insertion, a problem arises that an excessive unbalanced load is applied to the outer ring and the cam member. Further, in this case, if relative positions of the gap between the two rolling elements and the guide groove do not match, it is necessary to move the rolling elements arranged in line by the insertion of the last rolling element, which results in a problem of making the load applied to the cam member larger.

SUMMARY OF THE INVENTION

In view of the above technical problems, an object of the present invention is to solve the above problem by providing a bearing assembling apparatus capable of assembling a bearing at a high speed, forming an entire apparatus in compact size, and preventing an excessive unbalanced load from being applied to the outer ring and the inserting means when inserting rolling elements.

Means for Solving the Problem

To this end, the present invention is structured as follows, for example, as illustrated in FIGS. 1 to 5 showing the embodiments of the present invention.

Specifically, a first aspect of the present invention relates to a bearing assembling apparatus for arranging a predetermined number of rolling elements (14) in an installation space (34) formed along an inner surface of an outer ring (6) of the apparatus, including: an inserting means (39) arranged within the outer ring (6); and a feeding means (41) for guiding the rolling elements (14) to the inserting means (39), wherein the above feeding means (41) is provided with a guide path (15) communicating with the inserting means (39) and capable of holding the rolling elements (14) in line, the above inserting means (39) is provided with receiving portions (35) receiving the rolling elements (14) fed from the feeding means (41), guide grooves (36) each directed toward the installation space (34) from each receiving portion (35), and a cam member (9) having a cam surface (38) pressing the above rolling elements (14) toward the installation space (34) on an outer peripheral surface, and rotating around a center axis (37) of the outer ring (6), a plurality of the guide paths (15) are provided, each receiving portion (35) faces an end portion of each guide path (15) closer to the inserting means (39), and each guide groove (36) is provided toward the installation space (34) from each receiving portion (35).

Further, a second aspect of the present invention relates to a bearing assembling apparatus for arranging a predetermined number of rolling elements (14) in an installation space (34) formed along an inner surface of an outer ring (6)

of the apparatus, including: an inserting means (39) arranged within the outer ring (6); and a feeding means (41) for guiding the rolling elements (14) to the inserting means (39), wherein the feeding means (41) is provided with a guide path (15) communicating with the inserting means (39) and capable of holding the rolling elements (14) inline, the inserting means (39) is provided with a receiving portion (35) receiving the rolling elements (14) fed from the feeding means (41), a guide groove (36) directed toward the installation space (34) from the receiving portion (35), and a cam member (9) having a cam surface (38) pressing the above rolling elements (14) toward the installation space (34) on an outer peripheral surface, and rotating around a center axis (37) of the outer ring (6), and a plurality of the cam surfaces (38) are formed in an outer peripheral surface of the cam member (9).

In the first aspect of the present invention mentioned above, the predetermined number of rolling elements are distributed to the plurality of guide paths, held therein, and fed to the plurality of receiving portions. On the other hand, the cam surface passes through the plurality of receiving portions during one rotation of the cam member. The rolling elements received in the respective receiving portions are pressed by the cam surface passing through the receiving portions, guided along the respective guide grooves, and inserted into the installation space. Thus, the same number of rolling elements as the number of the receiving portions, that is, the number of the guide paths, are inserted into the installation space per rotation of the cam member of one cam surface (38).

In the second aspect of the present invention mentioned above, the plurality of cam surfaces pass through the receiving portion during one rotation of the cam member. Each time when one of the cam surfaces passes through the receiving portion, a rolling element held in the receiving portion is pressed by the cam surface, guided along the guide groove, and inserted into the installation space mentioned above. Thus, if just one guide path (15) is provided, the same number of rolling elements as the number of the cam surfaces are inserted into the installation space per rotation of the cam member.

When the structures of the first aspect and the second aspect of the present invention are combined, the following number of the rolling elements are inserted to the installation space per one rotation of the cam member, the above number being obtained by multiplying the number of the guide paths by the number of the cam surfaces. In other words, if two sets of a guide path and a cam surface are provided, four rolling elements may be inserted per rotation of the cam member, and if three sets of a guide path and a cam surface are provided, nine rolling elements may be inserted per rotation of the cam member.

The guide grooves and the cam surfaces mentioned above may be provided at optional relative positions where the last plurality of the rolling elements among the predetermined number thereof may be simultaneously inserted into the installation space.

In this case, the stresses applied to the outer ring and the cam member are cancelled each other, since each cam surface of the cam member presses the rolling elements outward in a radial direction of the outer ring.

Here, the simultaneous insertion of the rolling elements mentioned above is more preferable, because each cam surface is exposed to a uniform stress when a plurality of rolling elements are inserted to the installation spaces at the same instant (errors in manufacturing such as processing and assembling may be tolerated). However, it is not necessary for the last of the rolling elements mentioned above to be inserted to the installation spaces at the same instant, because it is sufficient if the stresses applied to the cam member are cancelled each other. That is to say, the simultaneous insertion of the rolling elements according to the present invention means that one of the cam surfaces presses a rolling element while a different one of the cam surfaces presses a different rolling element.

It is more preferable that the plurality of cam surfaces mentioned above are provided at an approximately equal interval along the outer peripheral surface of the cam member, because the forces by which the respective cam surfaces press the rolling elements are balanced around the center axis of the outer ring, and the unbalanced load mentioned above is further reduced.

In this case, the rolling elements received within the installation space are separated into a plurality of lines. Accordingly, because the number of the rolling elements arranged in one line is small, it is possible to easily move the rolling elements and to keep the load applied to the cam member small, even if the displacement occurs in the relative positions of the gap to which the rolling element is newly inserted and the guide groove mentioned above.

Here, it is preferable that the above approximately equal interval mentioned above is accurately equal interval (errors in manufacturing may be tolerated). However, there is a case that the predetermined number of the rolling elements arranged in the installation space cannot be divisible by the number of the cam surfaces mentioned above. In this case, the interval between the rolling element pressing positions of the plurality of cam surfaces may be different in a range equal to or less than the diameter of the rolling element.

The predetermined number of rolling elements may be optionally distributed so as to be held in the plurality of guide paths mentioned above. However, when the predetermined number of rolling elements can be divisible by the number of the guide paths, it is preferable to have the same number of rolling elements held in each guide path because it is easy to manage the number of the rolling elements within the respective guide paths.

In the case that the predetermined number of rolling elements can not be divisible by the number of the guide paths, the numbers of the rolling elements held in the respective guide paths may be optionally different so that the total number of the rolling elements held in the respective guide paths equals to the predetermined number. In this case, however, it becomes complicated because the number of the rolling elements held in the respective guide paths needs to be managed.

In order to solve the above mentioned problem, the bearing assembling apparatus according to the present invention may also include: a first supply means for supplying the same number of rolling elements to each of the guide paths; and a second supply means for supplying residual rolling elements to at least one of the guide paths, the number of residual rolling elements being determined by subtracting the number of the rolling elements supplied by the first supply means from the predetermined number. For example, when inserting 15 rolling elements from two guide paths to the installation space via the inserting means, an odd number of rolling elements, such as one rolling element, may be held in any one of the guide paths by the second supply means and inserted into the installation space by the inserting means, and the residual rolling elements may be equally divided and held in the two guide paths. In this way, it is possible to easily manage the numbers of the rolling elements in the respective guide paths.

In this case, it is more preferable that the number of the rolling elements that are held and first inserted into the installation space by the second supply means is as small as possible, and the residual rolling elements are inserted thereafter by the first supply means because managing the number of the rolling elements in the guide path becomes even easier.

Effect of the Invention

It is possible to achieve the following effects with the present invention structured and operated in the above mentioned manner.

(1) In accordance with the first aspect of the present invention, the same number of rolling elements as the number of the receiving portions, that is, the number of the guide paths, are inserted into the installation space per rotation of the cam member. Thus, it is possible to arrange the predetermined number of rolling elements within the installation space in a shorter period of time in comparison with the conventional art mentioned above, thereby assembling the bearing at a high speed.

Further, since the predetermined number of rolling elements are distributed and held in the plurality of guide paths, it is possible to make each guide path and the feeding means for feeing the rolling elements in the guide paths short, thereby forming the whole apparatus in compact size.

(2) In accordance with the second aspect of the present invention, since the same number of rolling elements as the number of the cam surfaces are inserted into the installation space per rotation of the cam member, it is possible to arrange the predetermined number of rolling elements within the installation space in a shorter period of time in comparison with the conventional art mentioned above, thereby assembling the bearing at a high speed.

(3) When the structures of the first aspect and the second aspect of the present invention are combined, the following number of the rolling elements are inserted to the installation space per one rotation of the cam member, the above number being obtained by multiplying the number of the guide paths by the number of the cam surfaces. In other words, since the effects (1) and (2) mentioned above are applied in a synergistic manner, it is possible to assemble the bearing at an exponentially high speed.

(4) When the structures of the first aspect and the second aspect of the present invention are combined, and if the guide grooves and the cam surfaces mentioned above are provided at the positions where the last plurality of the rolling elements among predetermined number thereof can be simultaneously inserted into the above installation space, the stresses applied to the outer ring and the cam member are cancelled with each other when press fitting the last of the rolling elements into the installation space. Thus, it is possible to prevent the excessive unbalanced load from being applied to these members.

EXPLANATIONS OF NUMERALS 1 a bearing assembling apparatus
5 a bearing (a needle bearing)
6 an outer ring
9 a cam member
14 a rolling element (a needle)
15 a guide path
19 a first supply means (a first supply apparatus)
20 a second supply means (a second supply apparatus)
34 an installation space
35 a receiving portion
36 a guide groove
37 a center axis of an outer ring (6)
38 a cam surface
39 an inserting means
41 a feeding means

DETAILED DESCRIPTION OF THE INVENTION

The following describes an embodiment in accordance with the present invention with reference to the drawings.

Figure 1:
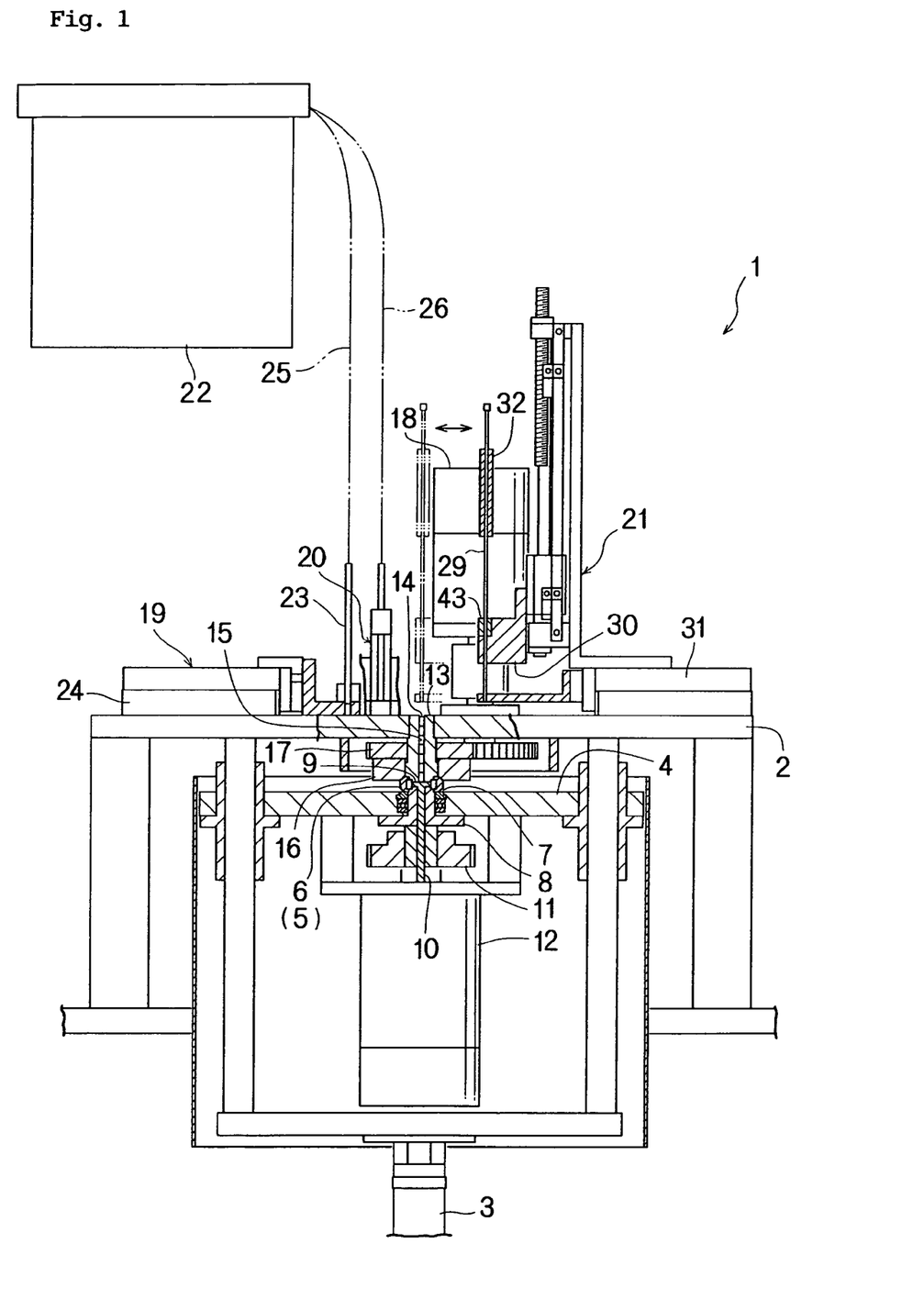
FIG. 1 is a partly broken front elevational view showing a schematic structure of a bearing assembling apparatus in accordance with an embodiment of the present invention.
Figure 2:
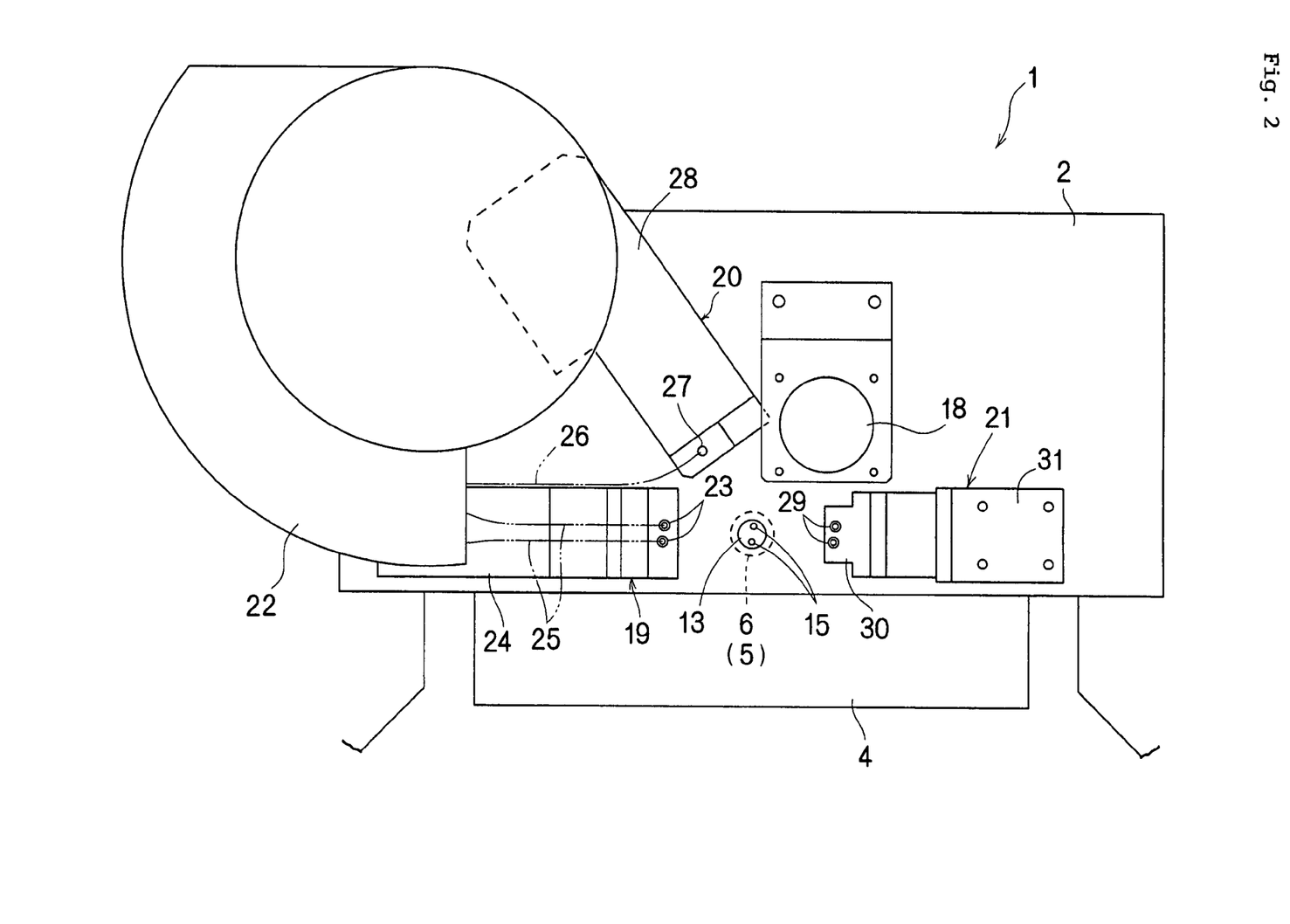
FIG. 2 is a plan view showing the schematic structure of the bearing assembling apparatus in accordance with the embodiment.
Figure 3:
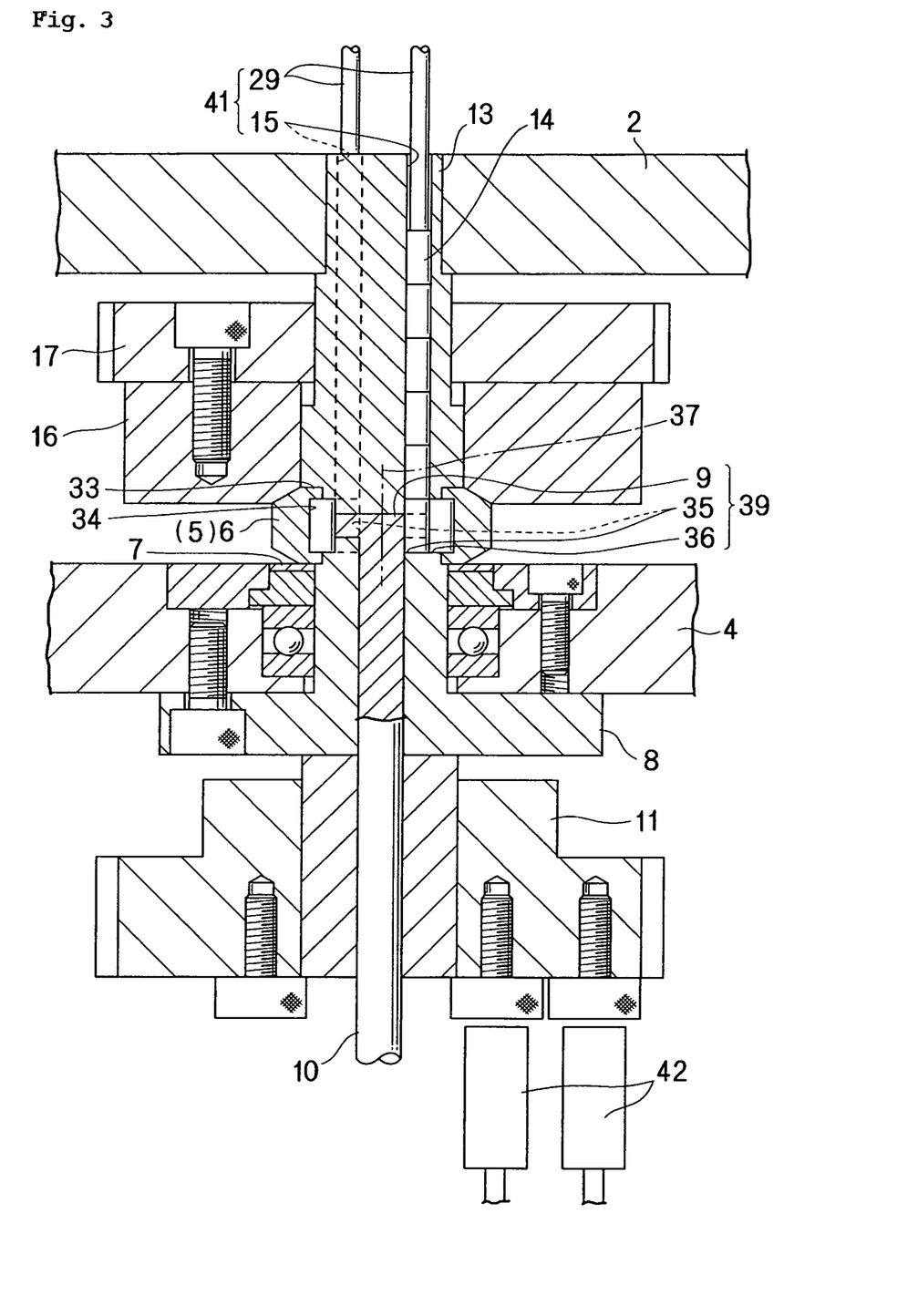
FIG. 3 is an enlarged cross sectional view near a working stage in accordance with the embodiment.
Figure 4:
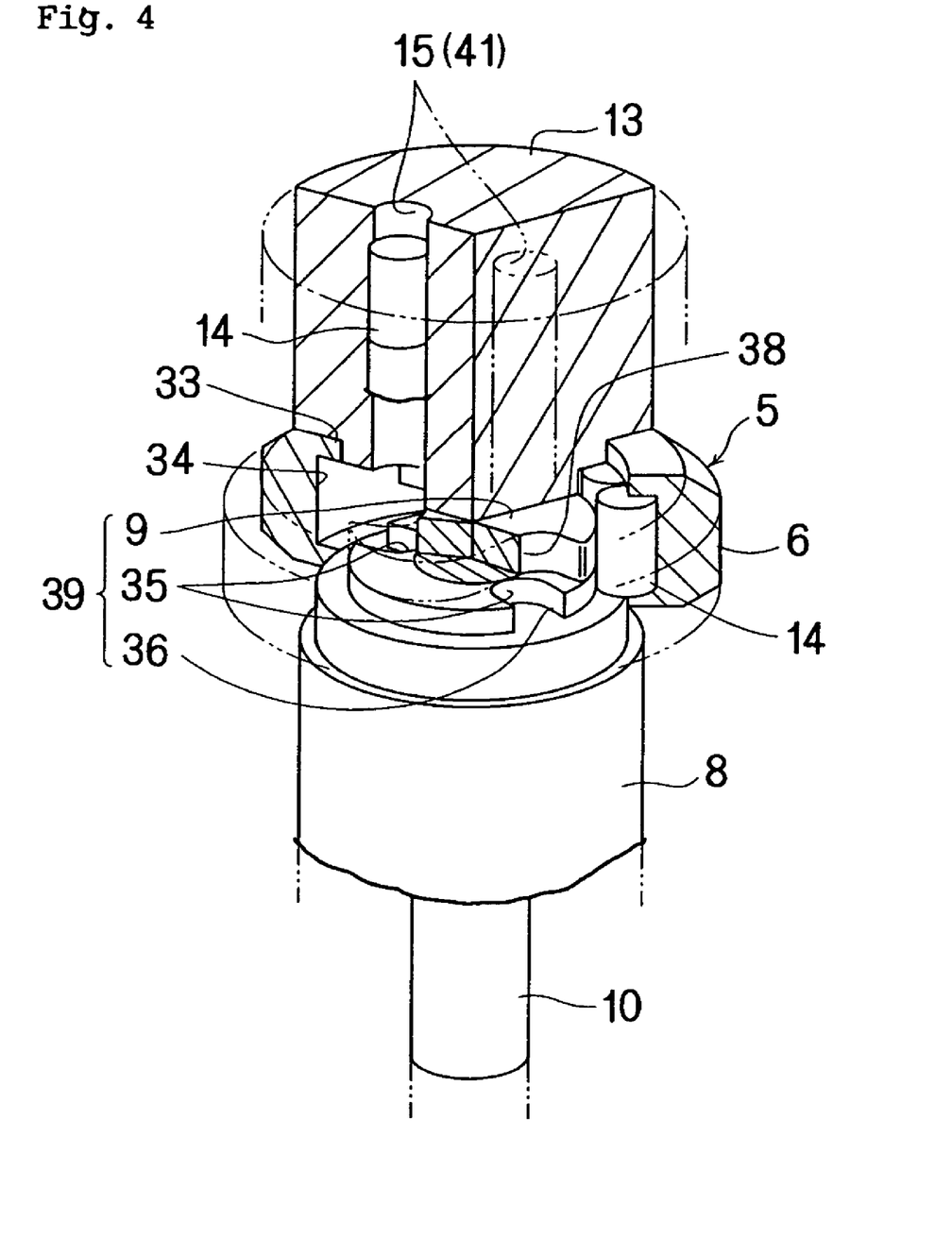
FIG. 4 is a partly broken perspective view showing a main portion near inserting means in accordance with the embodiment.
Figure 5:
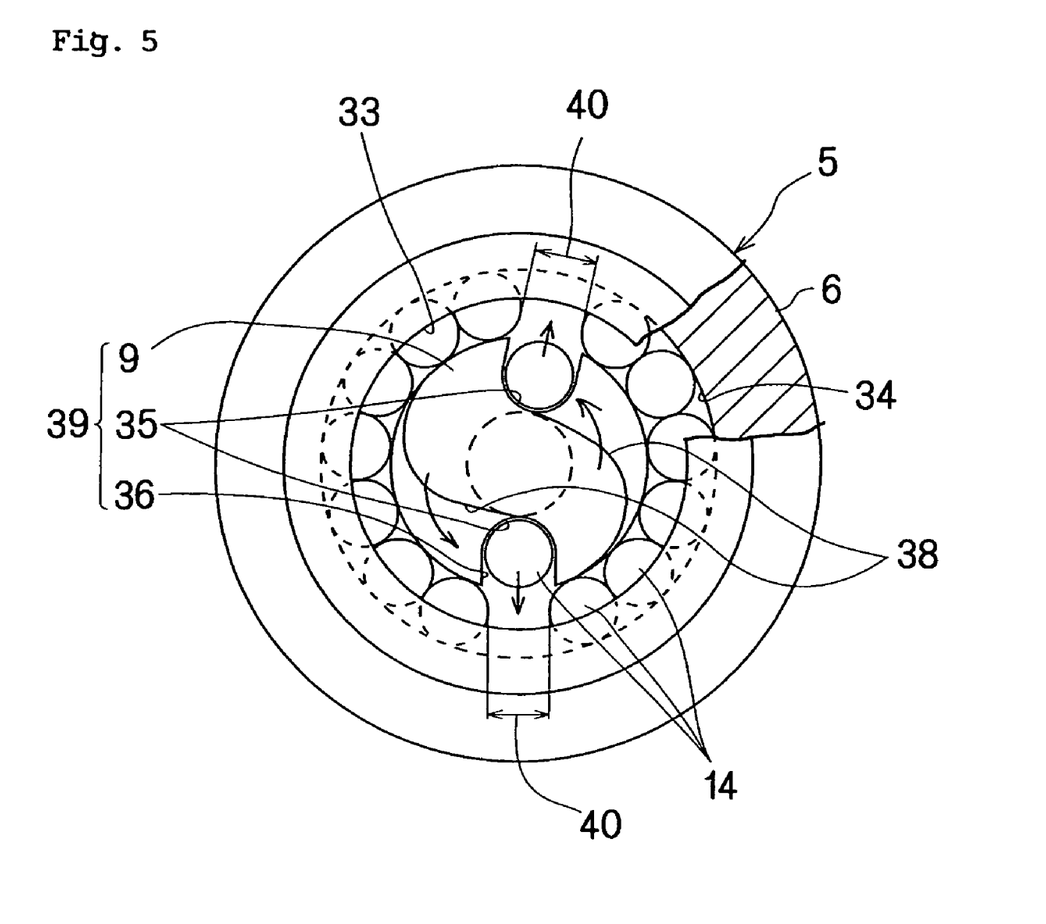
FIG. 5 is a partly broken plan view near the inserting means in accordance with the embodiment.

FIGS. 1 to 5 respectively show the embodiment in accordance with the present invention. FIG. 1 is a partly broken front elevational view showing a schematic structure of a bearing assembling apparatus in accordance with an embodiment of the present invention, FIG. 2 is a plan view showing the schematic structure of the bearing assembling apparatus in accordance with the embodiment, FIG. 3 is an enlarged cross sectional view near a working stage in accordance with the embodiment, FIG. 4 is a partly broken perspective view showing a main portion near inserting means in accordance with the embodiment; and FIG. 5 is a partly broken plan view near the inserting means in accordance with the embodiment.

As shown in FIG. 1, a bearing assembling apparatus (1) is provided with a fixed table (2), and an elevating table (4) elevated by an elevating cylinder (3) in a lower side of the fixed table (2). A working stage (7) supporting an outer ring (6) of a bearing (5) rotatably is formed in an upper surface of the elevating table (4), and a lower holder (8) is annexed, with an upper portion thereof protruded, to an upper surface of the working stage (7).

A cam member (9) is rotatably arranged in an upper surface of the lower holder (8), and a cam shaft portion (10) extended to a lower side from the cam member (9) is passed through the lower holder (8) upward and downward. A first gear (11) is fixed to a lower side portion of the cam shaft portion (10), and a first motor (12) annexed to the lower surface of the elevating table (4) is coupled in an interlocking manner to the first gear (11).

An upper holder (13) is suspended from the lower surface of the fixed table (2), in an upper side of the cam member (9). A guide path (15) capable of holding needles (14) serving as rolling elements in line is formed in a vertical direction within the upper holder (13), and an upper end and a lower end of the guide path (15) are respectively open to an upper surface and a lower surface of the upper holder (13).

A clamp apparatus (16) is rotatably annexed to the periphery of the upper holder (13) mentioned above. A second gear (17) is fixedly provided in the clamp apparatus (16), and a second motor (18) annexed to the upper surface of the fixed table (2) is coupled in an interlocking manner to the second gear (17).

As shown in FIGS. 1 and 2, an upper end surface of the upper holder (13) mentioned above is positioned in the upper surface of the fixed table (2) mentioned above. In addition, as shown in FIG. 2, two guide paths (15) mentioned above are formed in the upper holder (13).

In the upper surface of the fixed table (2) mentioned above, there are arranged the second motor (18), a first supply apparatus (19), a second supply apparatus (20), and a needle feeding apparatus (21), and a parts feeder (22) holding the needles (14) is arranged in an upper side of both the supply apparatuses (19 and 20).

The first supply apparatus (19) is provided with two stock portions (23), and a cylinder portion (24) moving the stock portions (23) onto the upper end surface of the upper holder (13) mentioned above. A predetermined number of needles (14) supplied from the parts feeder (22) via two first supply paths (25) are held in the stock portion (23) mentioned above.

On the other hand, the second supply apparatus (20) mentioned above is provided with a stock portion (27) holding the needles (14) supplied from the parts feeder (22) mentioned above via a second supply path (26), and a cylinder portion (28) moving the stock portion (27) onto the upper end surface of the upper holder (13). The stock portion (27) of the second supply apparatus (20) is structured so as to supply one needle (14) to one of the guide paths (15) mentioned above.

The needle feeding apparatus (21) mentioned above is provided with two feeding rods (29), a feeding rod support portion (30) supporting so as to freely elevate the feeding rods, and a cylinder portion (31) horizontally moving the feeding rod support portion (30) so as to move the feeding rod (29) to an upper side of the guide path (15) mentioned above. A weight (32) for feeding the needle (14) to the lower side is annexed to the feeding rod (29).

As shown in FIG. 3, a collar portion (33) is integrally formed in the outer ring (6) of the bearing (5) mentioned above so as to be directed toward an inner side from upper and lower end surfaces, and a bag-like installation space (34) open in a center side is formed along an inner surface of the outer ring (6). An upper portion of the lower holder (8), a lower portion of the upper holder (13) mentioned above and a cam member (9) arranged between the upper and lower holders (13) and (8) are arranged within the outer ring (6).

As shown in FIGS. 3 and 4, a receiving portion (35) receiving the needles (14) one by one is formed at two positions over the upper surface of the lower holder (8) and the lower surface of the upper holder (13). Further, a guide groove (36) directed toward the installation space (34) from the receiving portion (35) is formed in the upper surface of the lower holder (8) and the lower surface of the upper holder (13), respectively.

As shown in FIGS. 3 and 5, the cam member (9) mentioned above is arranged so as to rotate around a center axis (37) of the outer ring (6), and two cam surfaces (38) are formed in an outer peripheral surface. Each of the cam surfaces (38) presses the needle (14) respectively within the receiving portion (35) mentioned above to the installation space (34) side along the guide groove (36), by rotating the cam member (9).

An inserting means (39) for inserting the needle (14) into the installation space (34) is structured by the cam member (9), the receiving portion (35) mentioned above and the guide groove (36).

As shown in FIG. 5, both the guide grooves (36) mentioned above are arranged at predetermined relative positions in such a manner as to be capable of inserting the last two needles (14) among the predetermined number thereof into a gap (40) formed by the needles (14) already arranged within the installation space (34) mentioned above. Since fifteen needles (14) are arranged in this embodiment, one guide groove (36) is provided at a position rotated by 168 degree around the center axis of the outer ring (6) with respect to the other guide groove (36).

Both the cam surfaces (38) mentioned above are respectively provided at positions corresponding to the relative positions of both the guide grooves (36). Accordingly, both the cam surfaces (38) can simultaneously insert the last two needles (14) into the installation space (34) from the receiving portion (35), on the basis of the rotation of the cam member (9).

In addition, the cam surfaces (38) are provided at an approximately equal interval in an outer peripheral surface of the cam member (9) and, however, since they are not accurately provided at the equal interval, the relative positions between both the cam surfaces (38) and both the guide grooves (36) are shifted at a time of half rotating from a state in FIG. 5. However, since the displacement is small, one cam surface (38) starts pressing the needle (14) within one receiving portion (35) during the time when the other cam surface (38) presses the needle (14) within the other receiving portion (35).

As shown in FIG. 3, a lower end of the guide path (15) mentioned above is faced to the receiving portion (35) mentioned above. The feeding rod (29) is arranged in an upper side of the needle (14) held in the guide path (15), and is structured such as to feed the needle (14) to the lower side on the basis of a dead weight of the weight (32) mentioned above annexed to the feeding rod (29). In other words, a feeding means (41) for guiding the needle (14) to the receiving portion (35) of the inserting means (39) is structured by the guide path (15) and the feeding rod (29).

Next, a description will be given of a procedure of assembling the needle bearing (5) by the bearing assembling apparatus (1) mentioned above.

A predetermined number of needles (14) are previously supplied to the first supply apparatus (19) and the second supply apparatus (20) from the parts feeder (22) mentioned above, and are respectively held in the stock portions ((23) and (27)).

Next, as shown in FIG. 3, the outer ring (6) of the needle bearing (5) is mounted to the working stage (7) on the elevating table (4) mentioned above, the elevating table (4) is moved upward by driving the elevating cylinder (3), and the outer ring (6) is pinched by the clamp apparatus (16). At this time, the inserting means (39) mentioned above is arranged within the outer ring (6).

In this state, the stock portion (27) is moved to the upper side of the guide path (15) by driving the cylinder portion (28) of the second supply apparatus (20), and one held needle (14) is fed to the receiving portion (35) from the guide path (15). Next, the cam member (9) is half rotated by driving the first motor (12), and the one needle (14) is inserted to the installation space (34) in the inner surface of the outer ring (6).

Next, the stock portion (27) of the second supply apparatus (20) is returned to the original position, the stock portion (23) is moved to the upper side of the guide path (15) by driving the cylinder portion (24) of the first supply apparatus (19), and the needles (14) which are held seven by seven in two stock portions (23) are moved into both the guide paths (15). Further, after the stock portion (23) of the first supply apparatus (19) is returned to the original position, the feeding rod (29) of the needle feeding apparatus (21) is allowed to be positioned in the upper side of the guide path (15), and the needle (14) is fed to the lower side by the feeding rod (29).

The outer ring (6) mentioned above is rotated to the extent of a diameter of the needle (14) via the clamp apparatus (16) by driving the second motor (18), thereby forming a space to which the leading end of the guide groove (36) faces in the installation space (34). Further, when the cam member (9) is half rotated by the first motor (12), each of the cam surfaces (38) passes through the receiving portion (35), presses the respective needles (14) within the receiving portion (35), and inserts the needles (14) to the installation space (34).

The needle (14) within the guide path (15) is sequentially fed to the receiving portion (35) with the pressing rod (29) by repeating the rotation of the outer ring (6) and the rotation of the cam member (9) mentioned above, and is thereafter inserted into the installation space (34) by the cam surface (38). Twelve needles (14) are inserted into the installation space (34) by rotating the cam member (9) three times, resulting in a state shown in FIG. 5.

In this state, thirteen needles are arranged within the installation space (34) in conjunction with one needle (14) which is first inserted, and the gap (40) is formed at two positions where the guide grooves (36) face to each other. The gap (40) is slightly narrower than the outer diameter of the needle 14; however, the last two needles (14) within the receiving portion (35) are pressed by both the cam surfaces (38) by rotating the cam member (9) from this state, and are press-fitted to the installation space (34) from the gap 40 mentioned above. Accordingly, the assembly of the needle bearing (5) is finished, and the finished needle bearing (5) is detached from the working stage (7) by moving the elevating table (4) downward.

In order to detect the completion of the assembly, a sensor is provided in the bearing assembling apparatus (1) mentioned above.

Specifically, as shown in FIG. 3, a rotational speed confirming sensor (42) for detecting a rotational speed of the first gear (11) is provided near the first gear (11), whereby it is possible to detect that the cam member (9) rotates, for example, at four turns. Further, as shown in FIG. 1, a proximity sensor (43) is annexed to the feeding rod support portion (30) in the needle feeding apparatus (21). The weight (32) comes close to the proximity sensor (43), whereby the feeding rod (29) moves downward to the lowest portion, and it is possible to detect that the last needle (14) is fed to the receiving portion (35).

Further, the first motor (12) mentioned above is constituted, for example, by a servo motor, and it is possible to confirm that the inserted number of the needles (14) is neither too much nor too little and the sizes of the needles (14) are not different, by detecting a load on the basis of a motor current value at a time of press fitting the last needle (14).

The bearing assembling apparatus described in the embodiment mentioned above is exemplified for embodying the technical idea of the present invention, the shape and the structure of the bearing, the shape and the structure of the cam member, the feeding apparatus and the supply apparatus, and the like are not limited to this embodiment, and various modifications can be added within the scope of the present invention.

In the embodiment mentioned above, fifteen needles are employed. However, it goes without saying that the number of the rolling elements may be set optionally. In addition, a roller or a ball may be employed as the rolling element.

In the above explanation, one needle is supplied to the second supply apparatus and the residual needles are supplied by the first supply apparatus, and thus, it is possible to efficiently supply the needles so as to be inserted into the installation space. However, the rolling elements of an odd number of not less than three may be supplied instead. Further, three or more guide paths may be formed. In the case in which the number of the guide paths is three and the predetermined number of rolling elements are constituted by 14 rolling elements, for example, two rolling elements may be supplied by the second supply apparatus. In addition, it is possible to eliminate the second supply apparatus, in the case where the predetermined number of the rolling elements can be divisible by the number of the guide paths.

The cam member in accordance with the embodiment mentioned above is formed such that both the cam surfaces can simultaneously insert the last two needles into the installation space, however, the forming position of the cam surface can be optionally set, and may be formed, for example, at positions having an accurately equal interval, in the outer peripheral surface of the cam member.

Further, in the embodiment mentioned above, two sets of a cam surface and a receiving portion or a guide path are provided, which makes it possible to insert the needles to the installation space at a high speed about four times higher than the speed of the conventional art mentioned above. In the present invention, however, it is sufficient if either of the number of the cam surfaces or the number of the guide paths is plural, and it does not necessarily have to provide the same number of the cam surfaces and the guide paths. For example, in the case where two sets of a guide path and a receiving portion and three cam surfaces are formed, it is possible to insert the rolling elements into the installation space at a speed of six times higher in comparison with the conventional art mentioned above.

INDUSTRIAL APPLICABILITY

According to the present invention, it is possible to assemble the bearing at a high speed, to form the whole apparatus in compact size, and to prevent the excessive unbalanced load from being applied to the outer ring and the inserting means when inserting the rolling elements. Thus, the present invention is preferably utilized for assembling various bearings provided with the bag-like installation space such as the needle bearing.

What is claimed is:

1. A bearing assembling apparatus for arranging a predetermined number of rolling elements in an installation space formed along an inner surface of an outer ring, the bearing assembling apparatus comprising:

an inserting means for inserting the rolling elements into the installation space and for being disposed within the outer ring;

a feeding means for guiding the rolling elements to said inserting means, said feeding means including a plurality of guide paths communicating with said inserting means and capable of holding the rolling elements in line;

a first supply means for supplying the same number of rolling elements to each of said guide paths; and a second supply means for supplying residual rolling elements to at least one of said guide paths, the number of residual rolling elements being determined by subtracting the number of the rolling elements supplied by said first supply means from the predetermined number of rolling elements, wherein said inserting means includes a plurality of receiving portions receiving the rolling elements fed from said feeding means, a plurality of guide grooves, and a cam member having a cam surface formed on an outer peripheral surface thereof so as to press the rolling elements toward the installation space, said cam member being rotatable around a center axis of the outer ring, wherein said guide grooves extend from said receiving portions, respectively, toward the installation space, and wherein said receiving portions are arranged facing end portions said guide paths, respectively, so as to receive the rolling elements from said guide paths.

2. The bearing assembling apparatus of claim 1, wherein said cam member has a plurality of cam surfaces formed on an outer peripheral surface thereof so as to press the rolling elements toward the installation space.

3. The bearing assembling apparatus of claim 2, wherein said guide grooves and said cam surfaces are arranged such that a last plurality of rolling elements of the predetermined number of rolling elements can be simultaneously inserted into the installation space.

4. The bearing assembling apparatus of claim 2, wherein said cam surfaces are provided on said outer peripheral surface of said cam member and spaced around the center axis of the outer ring at an approximately equal interval.

5. The bearing assembling apparatus of claim 2, wherein said guide grooves are provided around the center axis of the outer ring at an approximately equal interval.

6. The bearing assembling apparatus of claim 2, wherein said guide grooves and cam surfaces are arranged such that the last plurality of rolling elements of the predetermined number of rolling elements can be simultaneously inserted into the installation space,
wherein said cam surfaces are provided on said outer peripheral surface of said cam member and spaced around the center axis of the outer ring at an approximately equal interval, and
wherein said guide grooves are provided around the center axis of the outer ring at an approximately equal interval.

7. The bearing assembling apparatus of claim 2, wherein said guide grooves and said cam surfaces are arranged such that the last plurality of rolling elements of the predetermined number of rolling elements can be simultaneously inserted into the installation space, and
wherein said cam surfaces are provided on said outer peripheral surface of said cam member and spaced around the center axis of the outer ring at an approximately equal interval.

8. The bearing assembling apparatus of claim 1, further comprising a confirming sensor for detecting rotation of said cam member.

9. A bearing assembling apparatus for arranging a predetermined number of rolling elements in an installation space formed along an inner surface of an outer ring, comprising:
an inserting device which inserts the rolling elements into the installation space, said inserting device being provided for being disposed within the outer ring;
a feeding device which guides the rolling elements to said inserting device, said feeding device including a plurality of guide paths communicating with said inserting device and capable of holding the rolling elements in line;
a first supply device which supplies the same number of rolling elements to each of said guide paths; and
a second supply device which supplies residual rolling elements to at least one of said guide paths, the number of residual rolling elements being determined by subtracting the number of the rolling elements supplied by said first supply device from the predetermined number of rolling elements,
wherein said inserting device includes a plurality of receiving portions receiving the rolling elements fed from said feeding device, a plurality of guide grooves, and a cam member having a cam surface formed on an outer peripheral surface thereof so as to press the rolling elements toward the installation space, said cam member being rotatable around a center axis of the outer ring,
wherein said guide grooves extend from said receiving portions, respectively, toward the installation space, and
wherein said receiving portions are arranged facing end portions said guide paths, respectively, so as to receive the rolling elements from said guide paths.

10. The bearing assembling apparatus of claim 9, wherein said cam member has a plurality of cam surfaces formed on an outer peripheral surface thereof so as to press the rolling elements toward the installation space.

11. The bearing assembling apparatus of claim 10, wherein said guide grooves and cam surfaces are arranged such that the last plurality of rolling elements of the predetermined number of rolling elements can be simultaneously inserted into the installation space.

12. The bearing assembling apparatus of claim 10, wherein said cam surfaces are provided on said outer peripheral surface of said cam member and spaced around the center axis of the outer ring at an approximately equal interval.

13. The bearing assembling apparatus of claim 10, wherein said guide grooves are provided around the center axis of the outer ring at an approximately equal interval.

14. The bearing assembling apparatus of claim 10, wherein said guide grooves and cam surfaces are arranged such that the last plurality of rolling elements of the predetermined number of rolling elements can be simultaneously inserted into the installation space,
wherein said cam surfaces are provided on said outer peripheral surface of said cam member and spaced around the center axis of the outer ring at an approximately equal interval, and
wherein said guide grooves are provided around the center axis of the outer ring at an approximately equal interval.

15. The bearing assembling apparatus of claim 10, wherein said guide grooves and cam surfaces are arranged such that the last plurality of rolling elements of the predetermined number of rolling elements can be simultaneously inserted into the installation space, and
wherein said cam surfaces are provided on said outer peripheral surface of said cam member and spaced around the center axis of the outer ring at an approximately equal interval.

16. The bearing assembling apparatus of claim 9, further comprising a confirming sensor for detecting rotation of said cam member.

* * * * *